(12) United States Patent
Kraut et al.

(10) Patent No.: US 10,336,613 B2
(45) Date of Patent: Jul. 2, 2019

(54) METHOD AND DEVICE FOR CARRYING OUT A REACTION BETWEEN AT LEAST TWO REACTANTS

(71) Applicant: KARLSRUHER INSTITUT FUER TECHNOLOGIE, Karlsruhe (DE)

(72) Inventors: Manfred Kraut, Linkenheim-Hochstetten (DE); Roland Dittmeyer, Karlsruhe (DE); Bhanu Kiran Vankayala, Bangalore (IN)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 429 days.

(21) Appl. No.: 14/911,734

(22) PCT Filed: Aug. 6, 2014

(86) PCT No.: PCT/EP2014/002156
§ 371 (c)(1),
(2) Date: Feb. 12, 2016

(87) PCT Pub. No.: WO2015/022062
PCT Pub. Date: Feb. 19, 2015

(65) Prior Publication Data
US 2016/0236934 A1    Aug. 18, 2016

(30) Foreign Application Priority Data

Aug. 15, 2013   (DE) .................. 10 2013 108 832

(51) Int. Cl.
*B01J 19/00*   (2006.01)
*C01B 15/029*  (2006.01)

(52) U.S. Cl.
CPC ......... *C01B 15/029* (2013.01); *B01J 19/0093* (2013.01); *B01J 2219/0086* (2013.01); *B01J 2219/00783* (2013.01); *B01J 2219/00835* (2013.01); *B01J 2219/00891* (2013.01); *B01J 2219/00894* (2013.01); *B01J 2219/00907* (2013.01); *B01J 2219/00921* (2013.01)

(58) Field of Classification Search
None
See application file for complete search history.

(56) References Cited

U.S. PATENT DOCUMENTS 7,105,143 B2   1/2006   Rueter
7,067,103 B2   6/2006   Rueter
(Continued)

FOREIGN PATENT DOCUMENTS

DE    19642770 A1    4/1998
DE    10044526 A1    4/2002
(Continued)

*Primary Examiner* — Melissa S Swain
(74) *Attorney, Agent, or Firm* — Leydig, Voit & Mayer, Ltd.

(57) ABSTRACT

A method for carrying out a reaction between at least two reactants in a liquid reaction solution in at least one reaction zone so as to produce a reaction product includes carrying out a reaction continuously in a reaction flow for the at least one reaction zone in an extension of the at least one reaction zone as far as at least one reaction product outlet, introducing each of the at least two reactants over the extension of the at least one reaction zone via inlets in which the reaction flow is introduced, and removing the reaction product via the at least one reaction product outlet.

20 Claims, 6 Drawing Sheets (56) References Cited

U.S. PATENT DOCUMENTS

| | | |
|---|---|---|
| 2001/0003578 A1 | 6/2001 | Fischer et al. |
| 2004/0191159 A1 | 9/2004 | Rueter |
| 2008/0165616 A1 | 7/2008 | Schubert et al. |

FOREIGN PATENT DOCUMENTS

| | | |
|---|---|---|
| DE | 102005015433 A1 | 10/2006 |
| DE | 102005042920 A1 | 3/2007 |
| WO | WO 2005105665 A2 | 11/2005 |
| WO | WO 2007028375 A1 | 3/2007 |

Fig. 1a

Fig. 1b
Section A-A

METHOD AND DEVICE FOR CARRYING OUT A REACTION BETWEEN AT LEAST TWO REACTANTS

CROSS REFERENCE TO RELATED APPLICATIONS

This application is a U.S. National Stage Application under 35 U.S.C. § 371 of International Application No. PCT/EP2014/002156 filed on Aug. 6, 2014, and claims benefit to German Patent Application No. DE 10 2013 108 832.5 filed on Aug. 15, 2013. The International Application was published in German on Feb. 19, 2015 as WO 2015/022062 A1 under PCT Article 21(2).

FIELD

The invention relates to a method and to a device for carrying out a reaction between at least two reactants. The invention also relates to continuous synthesis of basic and intermediate chemical products, in particular direct synthesis of hydrogen peroxide $H_2O_2$ from the gaseous starting materials oxygen $O_2$ and hydrogen $H_2$, preferably using catalytic methods.

BACKGROUND

A number of chemical reactions, in particular exothermic reactions, e.g. direct synthesis of hydrogen peroxide $H_2O_2$ from the gaseous starting materials oxygen $O_2$ and hydrogen $H_2$, result in schematic problems which have to be taken into account when implementing said reactions or which place limitations thereon. In particular, undesirable side reactions are to be expected that are produced by unfavourable, in particular inhomogeneous, concentration ratios of the starting materials and reaction products in the reaction chamber. In the case of $H_2O_2$ direct synthesis, this inhomogeneity makes it easier for explosive gaseous mixtures to form which can lead to dangerous operating conditions in a system. A further problem relates to mass transport resistance in flows, in particular when gases are intended to be dispensed into liquids. Depending on the system, the effects increase as the associated reaction volume used for the reaction in each case also increases.

Proceeding from such limitations and risks, a reactor system is for example described in DE 10 2005 015 433 A1, in which mixing and a subsequent reaction are separated into a plurality of micromixers or microreactors connected in parallel. The processes in the reactor system are thus divided into smaller units that can be controlled more efficiently, meaning that not only does the temperature control during the reaction and the connection in parallel increase the reaction conversion that can be produced, but the risk of producing inhomogeneity and explosive gaseous mixtures as set out above can also be reduced.

Furthermore, a microstructure reactor is described in DE 100 44 526 A1, in which two starting materials are directed into groups of microchannels arranged in parallel with one another. In this process, one starting material is introduced into the flow of the other starting material at different locations and thus at different intervals via a plurality of overflow openings arranged behind one another, resulting in a gradual reaction in the flow in the microchannels to form a flow of reaction product. The concentration of one of the two reactants increases along the length of the reaction product flow path, while the concentration of the other reactant decreases. Adding one starting material to the other flow of starting material at different locations and thus at different intervals makes it possible to control the reaction between the two starting materials more efficiently.

Direct synthesis for producing hydrogen peroxide from the starting materials $H_2$ and $O_2$ represents a particular challenge in the experiment. By way of example, DE 196 42 770 A1 discloses direct synthesis of this type for producing hydrogen peroxide, in which the gaseous starting materials $H_2$ and $O_2$ are converted into liquid $H_2O_2$ using a catalyst. The reaction is always carried out in the presence of a solvent in which at least one noble metal, in particular palladium, acting as the catalyst is suspended. The risk of explosion is avoided by the $H_2$ concentration in the gas phase being limited to 5% at most. The described reactor comprises a trickle bed in which the thin liquid film is saturated by means of the solid catalyst by said film being in open contact with the gas phase.

Membrane reactors have been proposed for direct synthesis of hydrogen peroxide which distribute an intake of the starting materials into the reaction and increase the safety and the selectivity of the method. Thus, Choudhary et al.: Angew. Chem. Int. Ed. 40 (2001), 1776-1779 describes using impenetrable membrane layers consisting of palladium alloys, by means of which the $H_2$ required for the reaction was added to a liquid that was saturated with oxygen. In this process, the reaction took place on the liquid-side surface of the palladium membrane, to which surface various layers were applied for this purpose in order to increase the selectivity of the reaction.

Furthermore, by way of example, WO 2007/028375 A1 describes porous membranes into which palladium as a catalyst in the form of metal nanoparticles was introduced for direct synthesis of $H_2O_2$. In this concept, either $H_2$ or $O_2$ is added in a bubble-free manner to the reaction solution that is saturated with the other starting material via a porous membrane. The conversion takes place inside the cover layer of the porous membrane in which the catalyst is located.

The variants described in WO 2007/028375 A1, in which the hydrogen or the oxygen is fed along the reaction zone via tubular membranes, are subject to a comparatively high mass transport resistance (mass transfer of gas/liquid and diffusion in the liquid phase) caused by the relatively large inner diameter of technically standard membranes. Furthermore, in the proposed method, the conversion factor achieved when passing through the reactor is limited by the gas solubility under the conditions in the upstream saturator, and therefore, at tolerable system pressures, recirculation is required in order to produce concentrations of hydrogen peroxide (>3 wt. %) that are within the range of interest. This is relatively technologically complex. Additionally, only some of the fed oxygen is converted. The rest of the oxygen is lost when the pressure is relieved before the liquid phase is recirculated into the saturator, or said oxygen has to be retrieved from the gas flow, which is a considerably complex process.

U.S. Pat. No. 7,067,103 B2 and U.S. Pat. No. 7,105,143 also disclose catalytic reactors for directly synthesising hydrogen peroxide by gradually adding $H_2$. The purpose of this gradual addition is to keep an $O_2$:$H_2$ concentration ratio along the reactor within an optimal range in a controlled manner, and at the same time to minimise the amount of unconverted $O_2$ that has to be separated from the reaction once again and recirculated. Gradually adding $H_2$ upstream of a reactor segment of a reactor cascade in each case is disadvantageous in that there is a possibility of explosive gaseous mixtures forming at the addition points and downstream thereof.

Bortolotto et al.: Sep. Purif. Sci. 73 (2010), 51 and Dittmeyer et al.: Appl. Catal. A: General 391 (2011), 311 also describe reactor designs that use different membranes in order to add two different starting materials into microchannels in a distributed manner in order to optimize the concentration ratio thereof along the reactor axis for conversion on a catalytically active surface. Both starting materials are added in a distributed manner in the same reactor portion via permeable walls arranged opposite one another. However, in these designs, the gaseous starting materials are not separated. By using microstructures, the risk of explosion is indeed reduced; however, it is impossible to assume inherent safety, particularly when the system pressure is comparatively high for direct synthesis of hydrogen peroxide.

SUMMARY

In an embodiment, the present invention provides a method for carrying out a reaction between at least two reactants in a liquid reaction solution in at least one reaction zone so as to produce a reaction product. The method includes carrying out the reaction continuously in a reaction flow for the at least one reaction zone in an extension of the at least one reaction zone as far as at least one reaction product outlet, introducing each of the at least two reactants over the extension of the at least one reaction zone via inlets in which the reaction flow is introduced, and removing the reaction product via the at least one reaction product outlet, wherein the at least two reactants are gaseous, wherein the inlets are spanned by sieve elements or membranes, and wherein the reactants are introduced in series and in an alternating manner into the reaction flow at each of the at least two inlets over the extension of the at least one reaction zone until saturation in the reaction solution is reached.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

According to embodiments of the invention, a method and a device are provided for carrying out a reaction between at least two reactants, in particular $H_2$ and $O_2$, in a reaction zone so as to produce a reaction product, in particular hydrogen peroxide $H_2O_2$, in such a way that certain drawbacks and limitations can be reduced. In particular, the danger of undesirable side reactions can be reduced and the reaction rate can be increased.

According to an embodiment, a method and a device are provided for carrying out a reaction between at least two reactants (starting materials) in at least one reaction zone so as to produce a reaction product. In cases where there are a plurality of reaction zones, these can advantageously be of the same type and are interconnected so as to be in parallel. The reaction takes place continuously in the reaction zone under formation of a reaction flow which flows as far as at least one, preferably exactly one, outlet for the reaction product. In the present case, a reaction zone is formed by a channel, preferably a microchannel having maximum cross-sectional dimensions (diameter, edge length etc.) of less than 5 mm, preferably less than 1 mm, at least one open channel end acting as an outlet. In this case, the reaction zone comprises inlets for the reactants that alternate along the reaction flow on the wall of the channel, the reactants being introduced into the reaction flow in the extension of the reaction zone via the inlets. The reaction flow runs in the reaction zone, preferably along a reactor axis which preferably interconnects the cross-sectional central points of the reaction zones.

The reaction flow is formed by a liquid reaction solution which flows continuously, i.e. said reaction flow covers the region of the reaction zone in which a reaction of at least two, preferably exactly two, reactants or of an intermediate product takes place so as to produce a reaction product. An intermediate product is produced for example by a reaction of reactants in the reaction zone as a precursor to a reaction product. The reactants are either liquids or gases. The reaction products in the reaction flow are also liquids or gases.

A catalyst in the form of particles, gas or liquid is preferably suspended or dissolved in the reaction solution, which may be saturated with a reaction partner. In addition to fixed catalysts (channel wall coating, micro fixed bed), suspended catalyst particles transported by means of the system or homogenously dissolved catalysts are also used, which advantageously means that there is a volume of catalyst in the entire reaction flow. Noble metals, in particular gold and palladium, and alloys on different supports are predominantly used as catalysts. Pd on C and Pd on silicate supports, preferably zeolite supports, more preferably titanium silicalite supports, are preferably used.

An alternative embodiment provides separate inlets for the catalyst. The catalyst is preferably introduced in the reaction flow direction at least before the last-introduced reactant is introduced, which is involved in a catalytic reaction so as to produce a reaction product or a reaction intermediate product. In so doing, it is advantageously ensured that the catalyst is already dissolved and/or suspended in the reaction flow, i.e. evenly distributed and already directly influencing the reaction, from the initial moment of contact with all the reactants that are involved in a reaction, i.e. directly at the inlet for the last-introduced reactant.

It is essential to incorporate the reactants into the reaction flow in a directed and alternating manner via alternating inlets, by means of which a continuous reaction over the entire extension of the reaction flow is maintained. This also involves adding, in an alternating distributed manner, the at least two, preferably exactly two, different gaseous reactants in consecutive portions of a compact microstructured apparatus, preferably via porous membranes or micro sieves, to the reaction flow. Repeated alternating addition in a distributed manner as set out above and abreaction results in a saw-tooth profile of the concentration of the reactants dissolved in the reaction zone in the liquid phase.

The inlets are preferably formed by sieve elements, membranes or other flow resistance mechanisms that prevent uncontrolled inflow so as to promote diffusion of the reactants. In this case, adding gaseous reactants into a liquid reaction not only effectively prevents proportions of gas from forming in the reaction, but also limits the influx of reactants in an advantageous manner by the absorbency of the reaction. The stoichiometry of the subsequent reaction is observed.

In particular, when synthesizing hydrogen peroxide $H_2O_2$, the two reactants $H_2$ and $O_2$ are gaseous before being incorporated, contact the liquid reaction product at the inlets and spontaneously diffuse therein. When synthesising $H_2O_2$, the catalyst is preferably suspended in the reaction solution.

In particular, as the reaction continuously progresses, alternatingly introducing just one reactant in each case at predetermined intervals in conjunction with directly using up the reactants in the reaction flow results in a saw-tooth concentration profile of the reactants that have not yet reacted in a particularly advantageous narrow concentration range along the channel axis, which promotes a stoichiometric and thus an optimum reaction. The concentration range extends preferably around the concentration value around the stoichiometry and is exceeded or not reached by one of the reactants depending on the amount added. The distances between two inlets, the specific volume flow of reactants via the inlets and the reaction flow, as well as the reaction rate in the reaction flow, have an effect on the concentration profile and thus the width of the above-mentioned concentration range.

In this case, one of the two reactants is introduced at the points in the reaction flow at which the saw-tooth concentration profile of this reactant in each case is at a minimum and thus this reactant has a cyclically recurrent low concentration (deficiency) in the reaction. When the underrepresented reactant is added, a concentration that is low compared with a reaction stoichiometry advantageously results in an increase in the reaction rate as the reaction approaches the stoichiometric ratio. However, since there is now an insufficient amount of one further component owing to the progression of the reaction, said component has to be added once again.

Adding at least two reactants in an alternating manner on a wall along the reaction flow of a reaction zone is particularly advantageous. The reaction solution is added and saturated by the reactants in an alternating manner on the same side, and therefore the Henry concentration (partial pressure of a gaseous reactant is proportional to the concentration of the reactant in the liquid reaction product) of the saturated gas is always reached at the inlet (preferably at the membrane or sieve element), and this concentration is subsequently involved in the reaction flow. The reaction rate depends on the reactant concentrations, which means that it is at its highest during incorporation directly at the inlets, i.e. preferably during saturation, and decreases as the reaction progresses. The introduction of a reactant is preferably changed every time the reaction rate has reached a lower limit, i.e. is too low.

The selectivity for the reaction product, e.g. hydrogen peroxide, is increased owing to the above-mentioned measures during direct synthesis with a high conversion factor. Moreover, both a reliable method and a high space-time yield are thus achieved. The high space-time yield also facilitates a compact design, a preferred use of microchannels as the reaction volumes and implementation as modular systems.

The reaction zone is formed as a microchannel or as a plurality of microchannels. The mass transfer resistance in the system away from the inlets is kept low by low lateral measurements of the flow channels in conjunction with a high wall surface area per fluid volume (microchannels). Said high wall surface area makes it possible for the starting materials to be supplied efficiently and in a bubble-free form according to the principle of a membrane contactor.

Not only do embodiments of the invention relate to a device and a method for carrying out a reaction between at least two reactants in a reaction zone in order to produce a reaction product, having all of or some of the above-mentioned features, but also to a use of the device and the method in particular for producing hydrogen peroxide from hydrogen and oxygen.

Figure 1A:
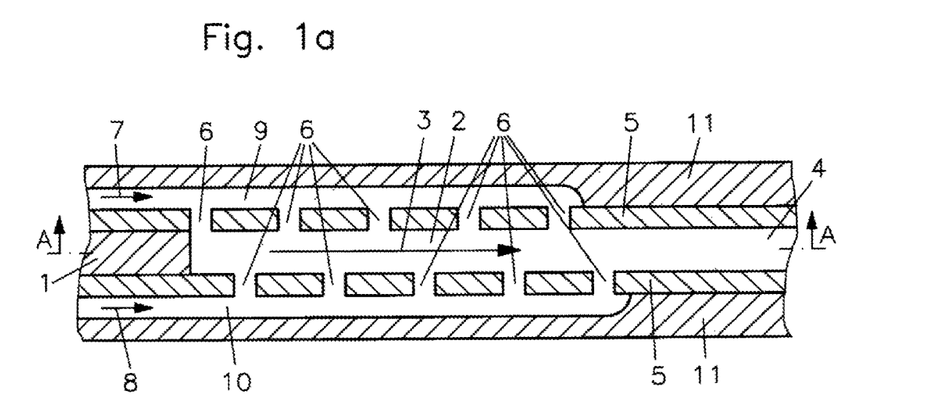
FIG. 1a through FIG. 1c are schematic views of embodiments of the invention having inlets that are opposite and offset from one another for carrying out a reaction between at least two reactants in a reaction zone so as to produce a reaction product in the form of stack of sheets, FIGS. 1a and 1c being sectional views and FIG. 1b being a sectional plan view.
Figure 1B:
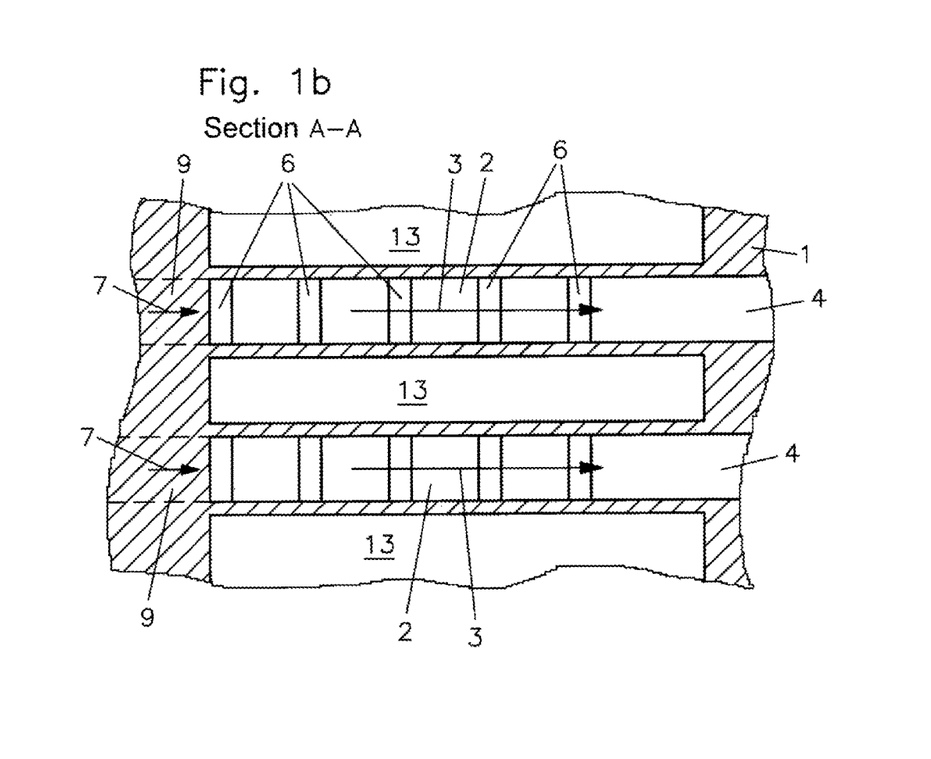

The embodiments of the device shown in FIGS. 1a and 1b show for example a design of the device in the form of a stack of sheets, in which the inlets for the two reactants are located on opposite walls of the reaction zone. The reaction zone 2 is located in a first sheet 1 in an opening, in which reaction zone an arrow 3 shows the direction of the reaction flow. The arrow thus follows the reaction axis of the reaction zone (axis of symmetry of the reaction zone with respect to the cross section of the reaction zone). The reaction zone opens in the direction of the reaction product outlet 4. As shown in FIG. 1a, both sides of the reaction zone adjoin intermediate layers 5 having inlets 6 formed as openings for two reactant flows 7 and 8 from a distribution channel 9 and 10, respectively. The distribution channels are in turn formed as grooves in second sheets 11. The first sheets 1 and/or the intermediate layers 5 directly adjoin the reaction zone and are preferably made from a catalyst material.

The sheets preferably have a thickness of between 0.2 to 3 mm, more preferably between 0.3 and 1.0 mm, even more preferably between 0.4 and 0.8 mm. Since the reaction zone is formed as a microchannel through an opening in the first sheet, the thickness of the sheet corresponds to a lateral cross-sectional dimension of the reaction zone.

Figure 1C:
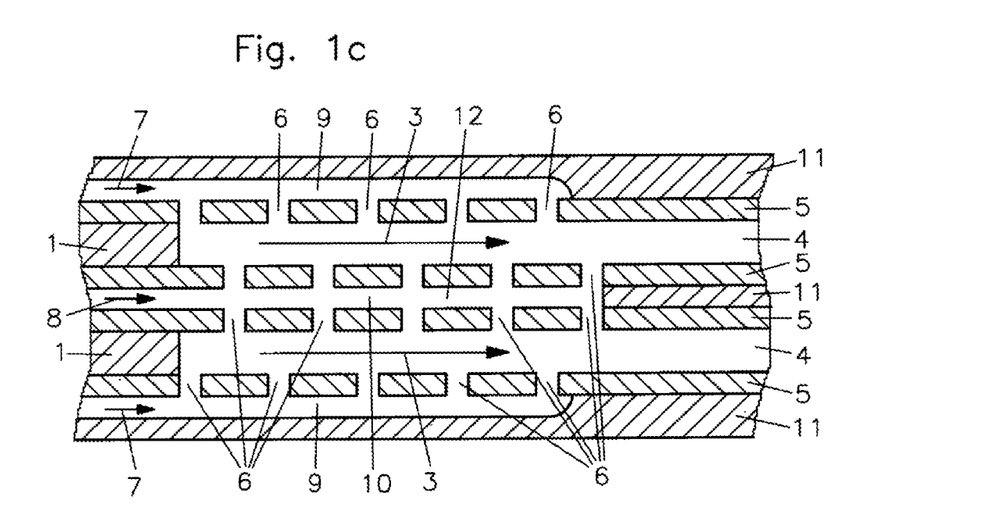

The arrangement shown in FIG. 1a shows a reaction module tier having a reaction volume and just one distribution channel for each of the reactants. An embodiment according to FIG. 1c provides integrating a plurality of reaction module tiers in the above-mentioned stack of sheets. The distribution channels for the reactants are preferably combined to form a shared distribution channel 12 between two reaction volumes 1, from which each of the inlets open out on both sides into one of the reaction volumes.

Figure 2A:
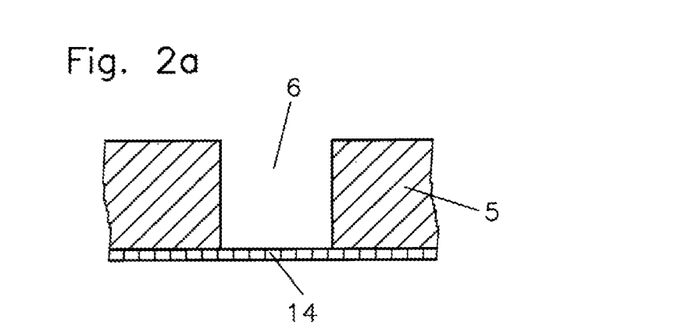
FIGS. 2a and 2b depict possible embodiments of the inlets according to an embodiment of the invention.
Figure 2B:
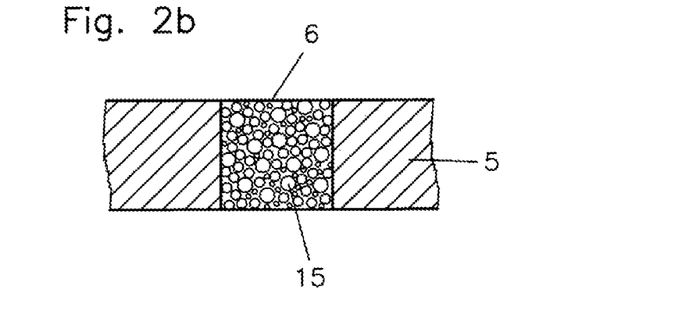

FIG. 2b shows a sectional plan view A-A (cf. FIG. 1a) in the height of the reaction volume 1. In this figure, a plurality of reaction volumes shown in FIG. 1a are arranged next to one another, fluid channels 13 being provided between these reaction volumes for controlling the temperature of the reaction flows. A temperature control fluid, preferably a coolant, passes through the fluid channels shown in FIG. 2b, preferably orthogonally to the image plane, i.e. in cross-flow to the reaction flows. This is advantageous in that the connections for the temperature control fluid The arrangement according to FIG. 2b is, in principle, also suitable for a plurality of reaction module tiers, as shown in FIG. 1c.

In an embodiment that is not explicitly shown, the first sheet and an intermediate sheet form a shared structured sheet.

The openings shown in FIG. 1a in the intermediate films are open, but can optionally be covered by a membrane (cf. FIG. 3b) or a mesh 14 (cf. FIG. 2a), or alternatively an open-pored element 15 (FIG. 2b) in order to prevent liquid mass from the reaction flow from refluxing into the distribution channels 9 and 10 for the preferably gaseous reactants. The risk of a reflux is preferably further reduced by surface tension between the gaseous and liquid phase. As shown in FIG. 2a, the mesh 14 is preferably applied to the intermediate layer 5 so as to be planar and is connected to a bi-material by a connection method (e.g. diffusion bonding) before it is integrated in the stack of sheets which the device comprises. The embodiment according to FIG. 2b, on the other hand, provides open-pored through-elements 15 in the inlets that are either elements that are press-fitted into the openings in the intermediate layer or are open-pored regions of parts of the intermediate layer. Membranes, meshes or open-pored elements are preferably made of a catalyst material.

By contrast, FIGS. 3a to 3e show embodiments in which the inlets for two reactants are arranged on at least one common wall of the reaction zone in series and in an alternating manner.

Figure 3A:
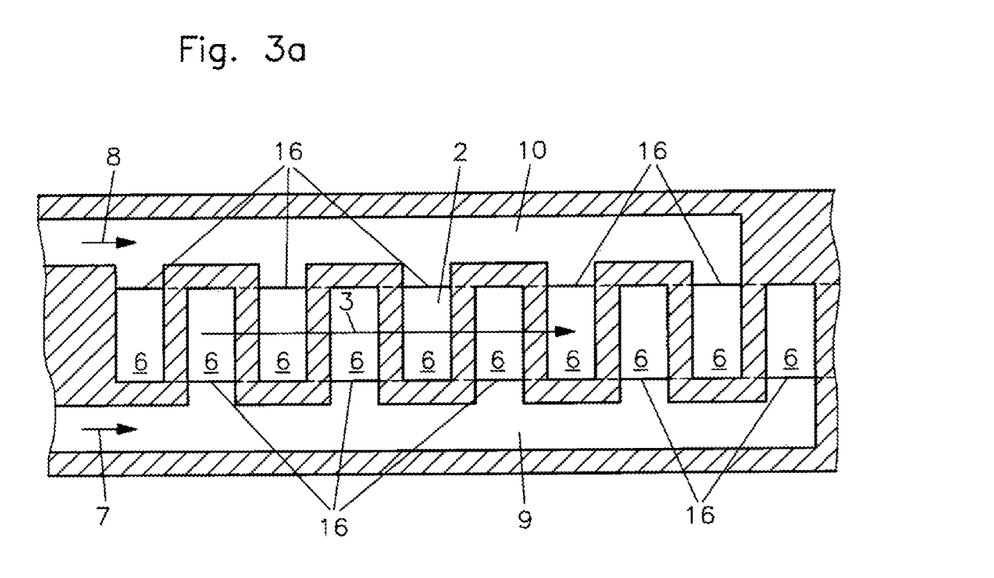
FIGS. 3a through 3e are schematic views of embodiments of the invention having inlets arranged on one side of the reaction zone in an alternating manner.
Figure 3B:
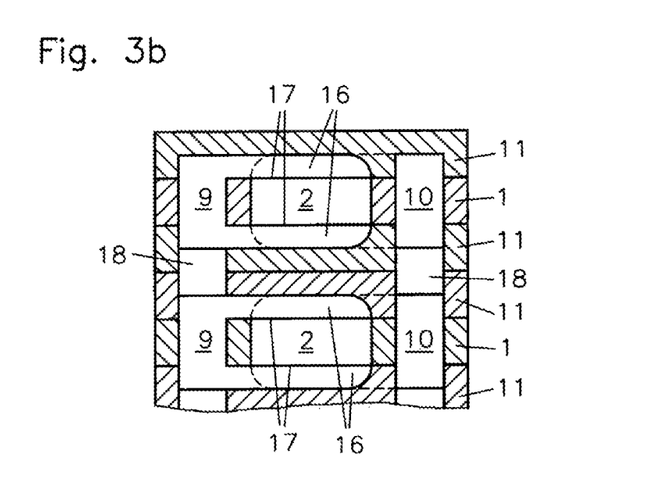

FIGS. 3a and 3b are two schematic sectional views of an embodiment having a central represent an embodiment in which the distribution channels 9 and 10 (for the first and second reactant flows 7 and 8, respectively) are arranged on both sides of the reaction zone 2 (which is not located in the sectional plane and is represented by a dashed line). Distributor arms 16 branch out from the distribution channels and extend over the inlets 6 over the reaction volume 1. FIG. 3b is a cross-sectional view of a layered arrangement of two reaction zones 2 having distributor arms 16 each arranged in a first sheet 1 and on both sides of this film in a second film 11, which distributor arms open out into one of the two distribution channels 9 or 10. FIG. 2b shows the sectional plane through distributor arms that are bound on the distribution channel 9, whereas the distributor arms bound on the distribution channel 10 are shown behind the first distributor arms by means of a dashed line. The inlets are located between the reaction zones and distributor arms, are completely covered by a membrane 17 and prevent or at least obstruct an unimpeded flow of gas components of the reactants into the liquid reaction flow. In FIG. 3b, as shown by way of example, the distribution channels 9 and 10 extend over the first and second sheet, wherein, in an arrangement of a plurality of devices each having a reaction zone, which zones are arranged on top of one another, the distribution channels for each reactant are fluidically connected to one another by means of overflow openings 18.

Figure 3C:
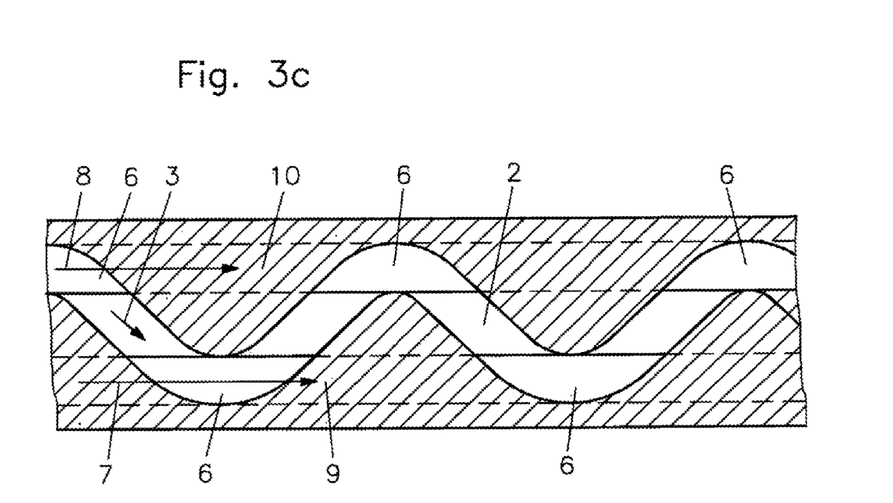

FIG. 3c is a sectional plan view of a portion of an embodiment having straight distribution channels 9 and 10 (for the first and second reactant flows 7 and 8, respectively, which are not located in the sectional plane and are represented by a dashed line), which extend over a serpentine reaction zone 2 (in the sectional plane). The sectional regions between the distribution chambers and the reaction zone form the inlets 6, preferably together with an interposed mesh layer or membrane layer.

The embodiment of the serpentine reaction zone 2 shown in FIG. 3c is preferably connected in parallel in the stack of sheets, i.e. horizontal and vertical with respect to the sectional plane or the sheet plane, in order to increase the capacity thereof.

Figure 3D:
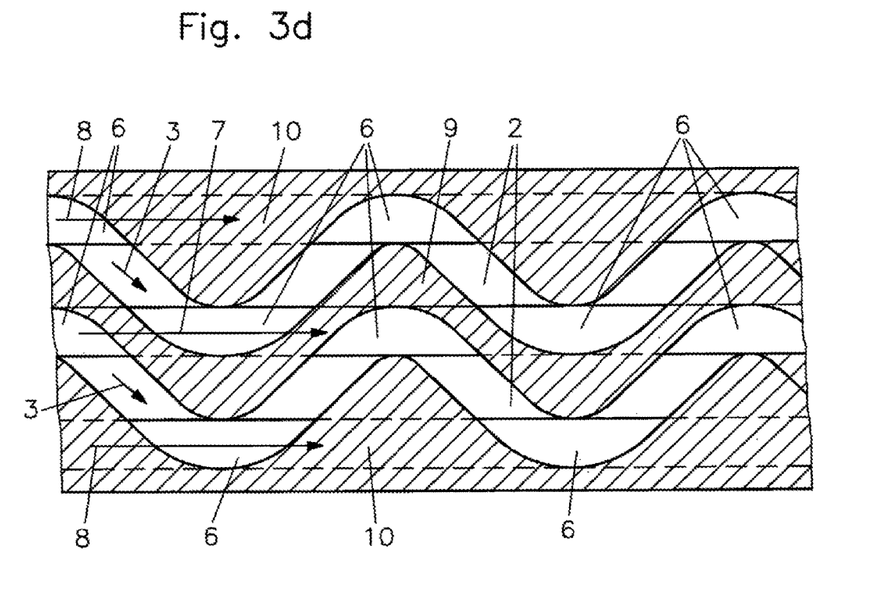
Figure 3E:
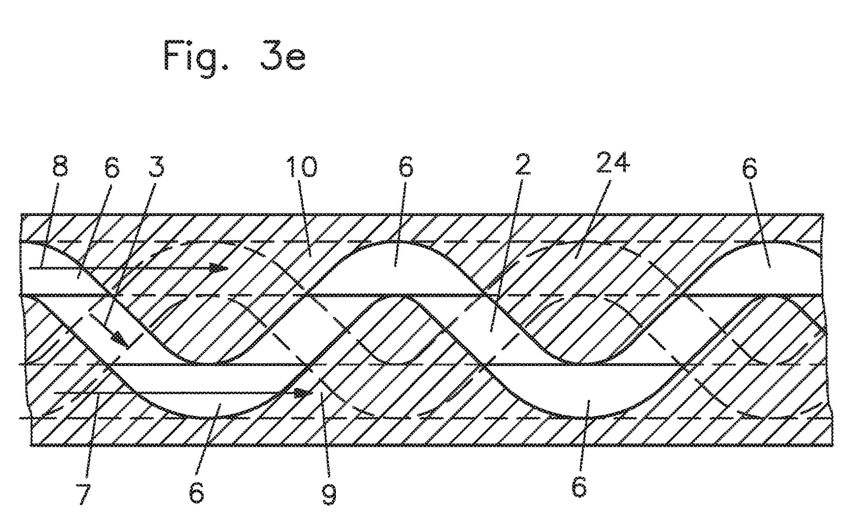

FIGS. 3d and 3e show corresponding embodiments. By way of example, FIG. 3d shows a (horizontally) parallel arrangement of the serpentine reaction zones 2 in the sectional plane, while FIG. 3e shows for example an embodiment in which the serpentine reaction zones 2 and 24 are arranged on both sides of the distribution channels 9 and 10, i.e. arranged so as to be vertical with respect to and in parallel with the sectional plane and the sheet plane. The second reaction zone 24 which is not arranged in the sectional plane is represented by a dashed line in FIG. 3e. The two embodiments according to FIGS. 3d and 3e also show an advantageous arrangement of inlets 6 arranged so as to be offset on the distribution channels in the respectively adjoining reaction zones, i.e. the inlets of a distribution channel that acts as a reactant well do not open out in two directions, i.e. two reaction zones, at the same time.

The inlets 6 shown in all the above-mentioned figures are for example not only at a constant distance from one another, but also are shown to be the same size for the two reactants. Both the distance from one another and the cross sections of the inlets are however determined by the reaction kinetics in the reaction zone. Preferably, the aim is for the saw-tooth concentration curve to be such that, when the geometric measurements are as set out above, the concentration of the reactants in the reaction zones come to be, as quickly as possible, in an advantageous narrow concentration range along the channel axis that represents the stoichiometric reaction.

Figure 4:
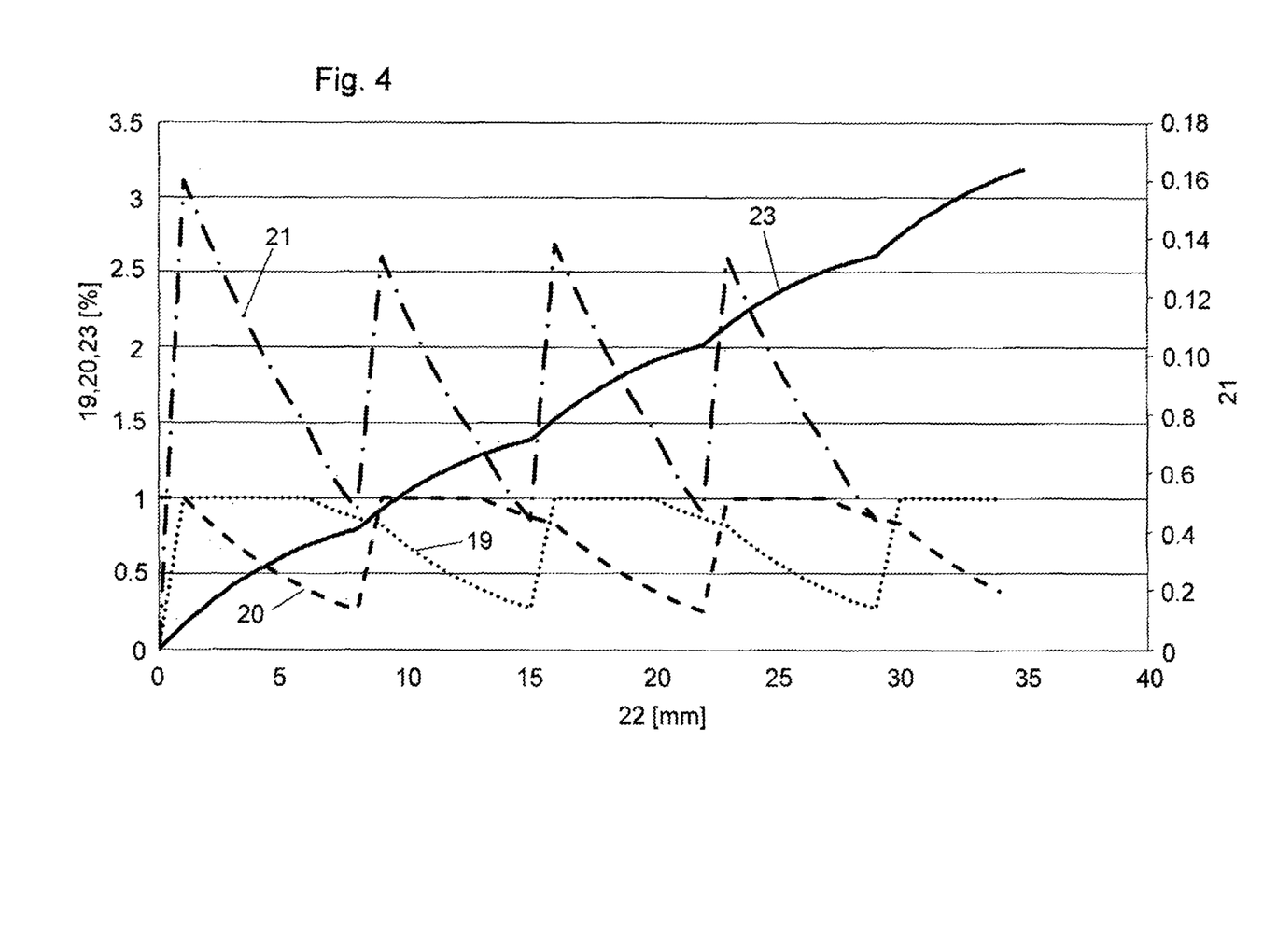
FIG. 4 shows the concentrations of reaction products A and B and the reaction rate in the extension of the reaction zone along the reaction flow.

Incorporating reactants A and B in the reaction flow in the reaction zone in an alternating manner, as set out above, results in the concentrations of the reactants in the reaction flow having a saw-tooth profile. Section A-A shows this staggered curve of the concentrations for the reactants A and B (19 and 20, respectively), together with the reaction rate 21 and the proportion of the reaction product C (23) over the extension of the reaction zone along the reaction flow, i.e. along the reaction axis 22, in mm. The concentrations of A and B are given in % of the respective saturation concentrations in the reaction mixture, while the concentration of product C is given relative to reactant A (left vertical axis on the graph), the reaction rate is given in Mol/l·s (right vertical axis on the graph).

Advantages of an embodiment of the invention set out below are described in more detail in the following with reference to an example of direct synthesis of $H_2O_2$ (reaction product C) from the reactants $H_2$ and $O_2$ (reactant A and B):

1. Avoiding Undesired Side Reactions Caused by Unfavourable Concentration Ratios in the Reaction Chamber:

In $H_2O_2$ direct synthesis, the gaseous starting materials $H_2$ and $O_2$ are converted to liquid $H_2O_2$ over preferably fixed catalysts. The reaction is carried out in the presence of a solvent, preferably methanol or also aqueous systems that may use other alcohols and different additives, such as bromide, which increases the selectivity. The problem regarding selectivity of the reaction results from the fact that the thermodynamically favourable $H_2O$ is formed in addition to the desired $H_2O$ in the same way. Furthermore, $H_2O_2$ is not only produced on the catalyst, but is also actively decomposed in subsequent reactions, pure decomposition into $H_2$ and $\frac{1}{2}O_2$ and also reduction with hydrogen being observed. Said reduction is comparatively quick and is particularly important for the integral selectivity. The rate of the individual reactions is dependent, to varying degrees, on the partial pressures of the starting materials $H_2$ and $O_2$ (different partial orders of reaction). Furthermore, the partial pressure ratio $H_2:O_2$ influences the oxidation state of the catalyst surface and thus the activity and selectivity. The resulting macroscopic conclusion is thus that activity and selectivity are heavily dependent on the concentrations and partial pressures of $H_2$ and $O_2$, and on the ratio between the two starting materials in the entire reaction chamber, and optimising the concentration ratios by the desired saw-tooth concentration profile in the above-mentioned reaction zones therefore leads to a clear improvement in the selectivity, the yield and the reactor power.

2. Avoiding Dangerous Operating Conditions Caused by Explosive Gaseous Mixtures Forming in Specific Geometric Regions Inside the System:

Direct synthesis from the elements is deemed to be an advantageous way to produce $H_2O_2$. In the past, no technical implementation has been achieved on an industrial scale because mixtures of $H_2$ and $O_2$ are virtually always explosive across the whole range of the composition. The explosive range at 1 bar is 4-75 vol % $H_2$ in air and 4-94 vol % in $O_2$ (cf. e.g. document [10]). Introducing the reactants oxygen and hydrogen into the reaction mixture in a staggered manner means that it is much rarer for both $H_2$ and $O_2$ to come into contact in a similar concentration. This results in the reactants being integrated in a preferred manner during synthesis of the reaction product $H_2O_2$, even before the reactants have been mixed with one another and before explosive gaseous mixtures can form.

3. Reducing a Low Space-Time Yield by Mass Transport Resistance, in Particular in the Liquid Phase, and Optionally During the Transition Phase to a Fixed Catalyst and by Reducing Concentrations Along the Reactor Axis.

The product $H_2O_2$ is a liquid when under the reaction conditions of direct synthesis and is absorbed by a solvent. Alcoholic or aqueous solutions are usually used. Owing to a comparatively low gas solubility of this solvent and owing to the low diffusion coefficients in the liquid phase, there is significant mass transport resistance. This resistance occurs particularly during the transition phase in the region of the inlets for the gaseous reactants in the liquid phase of the reaction, during the liquid phase itself and during the transition from the liquid or the gaseous phase to a fixed catalyst or inside the catalyst (porous). A catalyst dissolved and/or suspended in the liquid reaction product, preferably in the liquid reaction product, significantly reduces the required diffusion path. The use of microchannels increases the space-time yield owing to the low mass transport resistance in the boundary layer because virtually the entire channel volume consists of a boundary layer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 first sheet
2 reaction zone
3 arrow (reaction mixture and flow direction)
4 reaction product outlet
5 intermediate layer
6 inlet
7 reactant flow for first reactant
8 reactant flow for second reactant
9 distribution channel for first reactant
10 distribution channel for second reactant
11 second sheet
12 shared distribution channel
13 fluid channel
14 mesh
15 open-pored through-element
16 distributor arm
17 membrane
18 overflow opening
19 reactant A concentration
20 reactant B concentration
21 reaction rate
22 reaction axis
23 reaction product concentration
24 second reaction zone

The invention claimed is:

1. A method for carrying out a reaction between at least two reactants to produce a reaction product, the reaction being carried out in a liquid reaction solution that forms a reaction flow in at least one reaction zone, the method comprising:
   a) introducing each of the at least two reactants into the liquid reaction solution that forms the reaction flow, wherein the at least two reactants are introduced into the liquid reaction solution via a series of at least two inlets leading into the reaction zone, wherein the at least two inlets are spaced apart in a direction of the reaction flow, and wherein at each of the at least two inlets, a single one of the at least two reactants is introduced into the liquid reaction solution such that the at least two reactants are introduced into the liquid reaction solution in an alternating manner in the direction of the reaction flow,
   b) continuously carrying out the reaction in the liquid reaction solution that forms the reaction flow in the at least one reaction zone so as to produce the reaction product; and
   c) removing the reaction product via at least one reaction product outlet;
   wherein the at least two reactants are gaseous, and
   wherein each of the at least two inlets is spanned by a sieve elements or a membrane.

2. The method according to claim 1, wherein one of the at least two reactants is hydrogen and another of the at least two reactants is oxygen, and
   wherein the reaction product is hydrogen peroxide.

3. The method according to claim 1, wherein at least one catalyst material is dissolved or suspended in the liquid reaction solution that forms the reaction flow in the at least one reaction zone.

4. A device for carrying out a continuous reaction between at least two reactants to produce a reaction product, the device comprising:

at least one reaction zone configured to have introduced therein a liquid reaction solution that forms a reaction flow, the at least one reaction zone;

a reaction product outlet configured to absorb the reaction flow; and     a series of at least two inlets leading into the reaction zone, wherein the at least two inlets are spaced apart in a direction of the reaction flow, wherein each of the at least two inlets is configured to introduce a single one of the at least two reactants into the liquid reaction solution, wherein the series of the at least two inlets is configured to introduce the at least two reactants into the liquid reaction solution in an alternating manner in the direction of the reaction flow, and wherein each of the at least two inlets is spanned by a sieve elements or a membranes;

wherein the at least two reactants are gaseous.

5. The device according to claim 4, wherein the at least one reaction zone is formed by at least one microchannel having at least one open end that acts as the reaction product outlet.

6. The device according to claim 4, wherein at least one distributor channel is provided for each of the at least two reactants, the at least one distributor channel opening out into an inlet that is configured to introduce a corresponding one of the at least two reactants into the liquid reaction solution.

7. The device according to claim 4, wherein the sieve elements or membranes are provided in the device as planar layers or sheets that completely span at least the reaction zone in the extension thereof.

8. The device according to claim 5, wherein the device is formed by a stack of sheets comprising individual sheets, and     wherein the reaction zone and other means-channels for guiding a flow of the at least two reactants are formed by grooves and/or openings in the individual sheets.

9. The method according to claim 1, further comprising introducing at least one catalyst material into the liquid reaction solution that forms the reaction flow so as to dissolve or suspend the at least one catalyst material in the liquid reaction solution that forms the reaction flow.

10. The method according to claim 9, wherein the at least one catalyst material is introduced into the liquid solution via a catalyst inlet leading into the reaction zone.

11. The method according to claim 10, wherein the catalyst inlet is disposed upstream of at least one inlet of the series of the at least two inlets in the direction of the reaction flow.

12. The method according to claim 1, wherein the at least two reactants are introduced into the liquid reaction solution in an alternating manner in the direction of the reaction flow so as to produce a saw-tooth concentration profile in the direction of the reaction flow.

13. The method according to claim 12, wherein the saw-tooth concentration profile includes, for each of the at least two reactants, at least one saw-tooth feature, and wherein each saw-tooth feature includes a region of increasing concentration, a region of maximum concentration, and a region of decreasing concentration.

14. The method according to claim 13, wherein the saw-tooth concentration profile includes, for each of the at least two reactants, at least a first saw-tooth feature and a second saw tooth feature, and wherein the region of decreasing concentration of the first saw-tooth feature is connected to the region of increasing concentration of the second saw-tooth feature.

15. The method according to claim 13, wherein each region of maximum concentration corresponds to a saturation concentration of a respective reactant.

16. The method according to claim 15, wherein the saturation concentration is provided in a region of an inlet of the series of at least two inlets via which the respective reactant is introduced into the liquid reaction solution that forms the reaction flow.

17. The method according to claim 1, wherein a concentration of a respective reactant introduced at one of the at least two inlets reaches a saturation concentration in the liquid reaction solution.

18. The method according to claim 1, wherein the at least two reactants are introduced into the liquid reaction solution at saturation concentrations at the at least two inlets such that saturation concentrations of a first at least two reactants alternate with saturation concentrations of a second of the at least two reactants in the direction of the reaction flow.

19. The device according to claim 4, further comprising a catalyst inlet leading into the reaction zone, the catalyst inlet being configured to introduce at least one catalyst material into the liquid reaction solution that forms the reaction flow so as to dissolve or suspend the at least one catalyst material in the liquid reaction solution that forms the reaction flow.

20. The device according to claim 19, wherein the catalyst inlet is disposed upstream of at least one inlet of the series of the at least two inlets in the direction of the reaction flow.

\* \* \* \* \*